United States Patent

[11] 3,575,557

[72] Inventor Harvey H. McCowen
Rochester, N.Y.
[21] Appl. No. 747,642
[22] Filed July 25, 1968
[45] Patented Apr. 20, 1971
[73] Assignee General Dynamics Corporation

[54] TIME DIVISION MULTIPLEX SYSTEM
14 Claims, 9 Drawing Figs.

[52] U.S. Cl. .......... 179/15, 178/50
[51] Int. Cl. .......... H04l 7/06
[50] Field of Search .......... 178/50, 52, 53, 53.1; 179/15 (APC), (VDR), (ASYNC), (SYNC), 15 (A)

[56] References Cited

UNITED STATES PATENTS 3,042,751 7/1962 Graham .......... 179/15(ASYNC)
3,271,688 9/1966 Geschwind et al. .......... 178/53
3,299,204 1/1967 Cherry et al. .......... 179/15(ASYNC)
3,310,626 3/1967 Cassidy .......... 178/50
3,310,743 3/1967 Cleobury et al. .......... 179/15(VDR)
3,353,158 11/1967 Davis et al. .......... 340/172.5
3,461,245 8/1969 Johannes et al. .......... 178/50

*Primary Examiner*—William C. Cooper
*Assistant Examiner*—David L. Stewart
*Attorney*—Martin Lukacher

ABSTRACT: A time division multiplex system is described wherein several data input sources which run asynchronously are multiplexed onto a common link or line, together with coordination data to insure a synchronous flow of data into the line. The coordination data is used upon demultiplexing to control the rate at which demultiplexing is accomplished in order to keep the average rate of data flow through the system approximately constant.

INVENTOR.
HARVEY H. McCOWEN

BY M. [signature] ATTY

INVENTOR.
HARVEY H. McCOWEN

BY M. Lu Kachn ATTY

INVENTOR.
HARVEY H. McCOWEN

BY M. L. Kach ATTY

INVENTOR.
HARVEY H. McCOWEN
BY M. L. Kach ATTY

PATENTED APR 20 1971 3,575,557

SHEET 5 OF 6

INVENTOR.
HARVEY H. McCOWEN

BY M. L. [signature] ATTY

| COUNTER STATE | F | OUTPUT | A | B | C | D | E |
|---|---|---|---|---|---|---|---|
| 0 | 1 | 1 | X | X | X | X | X |
| 1 | 1 | 1 | X | X | X | X | X |
| 2 | 1 | 1 | X | X | X | X | X |
| 3 | 1 | 0 | X | X | X | X | X |
| 4 | 1 | 0 | X | X | X | X | X |
| 5 | 1 | A | X | X | X | X | X |
| 6 | 1 | A | X | X | X | X | X |
| 7 | 1 | B | X | X | X | X | X |
| 8 | 1 | B | X | X | X | X | X |
| 9 | 1 | C | X | X | X | X | X |
| 10 | 1 | C | X | X | X | X | X |
| 11 | 1 | D | X | X | X | X | X |
| 12 | 1 | D | X | X | X | X | X |
| 13 | 1 | E | X | X | X | X | X |
| 14 | 1 | E | X | X | X | X | X |
| 0 | 0 | 1 | 1 | 1 | 1 | 1 | 1 |
| 1 | 0 | 1 | 1 | 1 | 1 | 1 | 1 |
| 2 | 0 | 1 | 1 | 1 | 1 | 1 | 1 |
| 3 | 0 | 1 | 1 | 1 | 1 | 1 | 1 |
| 4 | 0 | 1 | 1 | 1 | 1 | 1 | 1 |
| 5 | 0 | 1 | 1 | 1 | 1 | 1 | 1 |
| 6 | 0 | 1 | 1 | 1 | 1 | 1 | 1 |
| 7 | 0 | 1 | 1 | 1 | 1 | 1 | 1 |
| 8 | 0 | 1 | 1 | 1 | 1 | 1 | 1 |
| 9 | 0 | 1 | 1 | 1 | 1 | 1 | 1 |
| 10 | 0 | 1 | 1 | 1 | 1 | 1 | 1 |
| 11 | 0 | 1 | 1 | 1 | 1 | 1 | 1 |
| 12 | 0 | 1 | 1 | 1 | 1 | 1 | 1 |
| 13 | 0 | 1 | 1 | 1 | 1 | 1 | 1 |
| 14 | 0 | 1 | 1 | 1 | 1 | 1 | 1 |
| 0 | 0 | 0 | 0 | 0 | 0 | 0 | 0 |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| 7 | 0 | 0 | 0 | 0 | 0 | 0 | 0 |
| 8 | 0 | 0 | 0 | 0 | 0 | 0 | 0 |
| 9 | 0 | 0 | 0 | 0 | 0 | 0 | 0 |
| 10 | 0 | 0 | 0 | 0 | 0 | 0 | 0 |
| 11 | 0 | 0 | 0 | 0 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 0 | 0 | 0 | 0 | 0 | 0 |

INVENTOR.
HARVEY H. McCOWEN
BY [signature] ATTY

TIME DIVISION MULTIPLEX SYSTEM

The present invention relates to time division multiplexing systems and particularly to a time division multiplexing system which is capable of operating with asynchronous sources of input data.

While the invention is especially suitable for use in multiplexing teletype information on a character-by-character basis (by a character is meant a certain number of bits which designate alpha numerics or other information in accordance with a code). The invention will also be found useful in multiplex systems which operate on a bit-by-bit basis.

It is often desirable that a time division multiplex system be capable of receiving, for transmission, several different data sources which operate asynchronously at different bit rates. These data sources may be, for example, card readers which operate at high rates for short periods of time, or teletypewriters which operate at relatively slow rates for longer periods of time. The aggregate rate of all of the sources would not, in any event, exceed the rate which can be handled on a multiplex data link. Efficient utilization of the link dictates, however, that the flow of information through the link be maintained at approximately the maximum bit rate of the line, and also that the flow control and redundant information bits will be needed. By virtue of the asynchronous nature of the data sources, it has been necessary to normalize all of the sources and to change their speeds and data formats to make the data and data rate compatible with the multiplex system. In order to accomplish this purpose, synchronizing systems including large buffer registers were heretofore necessary. These systems were complex and costly. Thus, in most instances, economic considerations precluded the use of time division multiplexing for the transmission of digital data, except in cases where the data inherently was synchronous as it arrived from several sources which had approximately like bit rates.

It is a feature of the invention to provide coordination information in the course of multiplexing the data from various asynchronous input sources such that the flow of data into and through the link will be at the maximum bit rate of the link and also to utilize the coordination information upon demultiplexing so as to sort the multiplex data stream into output data channels corresponding to the input channels in each of which output channels the average output rate, character format and message content will be substantially identical to the input data from the source at which they were derived.

It is an object of the present invention to provide an improved time division multiplex system which is more flexible than systems of this type which were heretofore available in that the system provided by the invention will be capable of handling nonsynchronous data inputs from sources having widely differing bit rates.

It is a further object of the present invention to provide an improved multiplex system where the average input and output data rates are the same, notwithstanding that input data may arrive at varying rates.

It is an object of the present invention to provide an improved time division multiplex system where several nonsynchronous inputs can be multiplexed onto a single serial output without the need for presynchronizers.

It is a still further object of the present invention to provide an improved time division multiplex system which is capable of accepting input data which arrives at varying rates up to a maximum rate corresponding to the input rate of the line or link across which the data is transmitted.

It is a still further object of the present invention to provide an improved time division multiplex system which automatically accommodates varying input bit rates from the different input data channels or sources which it serves.

It is a still further object of the present invention to provide an improved time division multiplex system which is relatively immune to loss of synchronization and recovers synchronization rapidly so as to efficiently utilize the data link.

It is a still further object of the present invention to provide an improved time division multiplex system capable of handling a large number of multiplexed channels which utilizes a relatively small amount of space and small number of components, thereby increasing reliability and decreasing maintenance time.

Briefly described, a time division multiplex system embodying the invention includes an input channel and an output channel for each data channel to be multiplexed onto a common link. A data rate control logic, responsive to the desired data rate input into the link and the arrival of input data from the source which feeds the input channel, inserts coordination information, say in the form of coordination characters among the data characters which arrive from the source. The output channel responds to the coordination characters by adjusting the rate at which data from the link is transferred to an output corresponding to the channel source, such that the data which arrives from the output channel corresponds in average rate to the data which is applied to the input channel for multiplexing and transmission.

The invention itself, both as to its organization and method of operation, as well as additional objects and advantages thereof will become more readily apparent from a reading of the following description in connection with the accompanying drawings in which.

Figure 1:
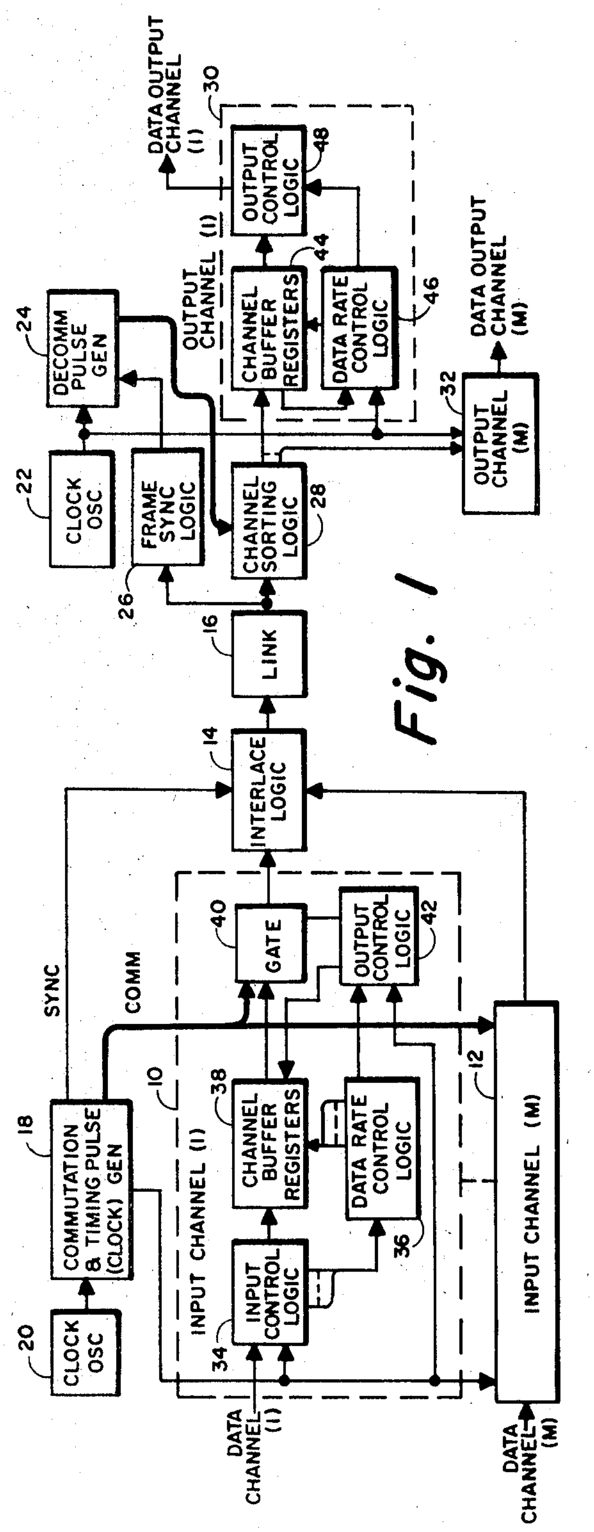
FIG. 1 is a block diagram of a time division multiplex system embodying the invention.

Referring now to FIG. 1, a plurality of data input sources indicated as data channels (1) through (M) provide input data at different rates to the multiplexing system. Only the first channel 10 and the last or Mth channel 12 are shown in the drawing for the sake of simplicity. Since all of the channels are similar, only the first channel 10 is shown in detail. The input data may be, and in most cases is, asynchronous.

Briefly, the input channels serve to insert the coordination characters and insure that the data is provided to interlace logic 14 at a speed commensurate with the maximum data rate of the data transmission link 16 which may, for example, be a wire line. The interlace logic 14 serves to interleave the input channel information into a single serial output. The output of the interlace logic may be connected to a modem which is located at the transmitting end of the link 16. A receive modem is associated with the receiving end of the link.

For the sake of this illustrative example, it will be assumed that the link rate is 75 bits per second. The data is interlaced from each of the input channels 10—12 on a character-by-character basis. Also interlaced with the data characters is a synchronization (sync) character which is generated by a commutation and timing pulse or clock generator system 18. Timing pulses are furnished to the input channels by the generator system 18. Master timing is provided by a clock oscillator 20 which feeds the commutation and timing pulse generator.

At the receiving terminal, another clock oscillator 22 and a decommutation pulse generator 24 are synchronized by a frame sync logic network 26 which extracts the sync characters from the data transmitted over the link 16. The decommutation pulse generator 24 controls channel sorting logic 28 which separates the serial output from the link 16 into separate output data channels corresponding to the (1) through (M) input data channels at the transmitting end of the system. The first of these output data channels 30 and the last of these output data channels 32 are shown in FIG. 1. Circuitry in these channels may be identical. By virtue of the systems within the output data channels, data may be delivered from each output channel, with the average output rate, character format and message contents identical to the input data from the sources.

The input data channels are capable of accepting sources of data which have any combination of data bit rates and duty cycles, so long as the aggregate bit rate does not exceed the link bit rate which in the illustrative example is 75 bits per second. Thus, for example, the first data channel may be connected to a 16⅔ word per minute (12.5 bits per second), on average, source of data, while the other channels may be the same or any other bit rate or word per minute channels, say 33⅓ or 66⅔ word per minute (25 or 50 bit per second average).

In the input channels, input control logic 34 is used to synchronize the input data stream with the local timing pulses from the commutation and timing pulse generator 18 and also to produce rate control pulses which are applied to data rate control logic 36. After passing through the input control logic 34, the data is applied to channel buffer registers 38 which convert the synchronous input characters which may have a length of 7.5 bits in this illustrative system to a 6-bit character for transmission. The 6-bit code is adequate for handling the entire teletypewriter character alphabet. Under the control of the data rate control logic 36, the channel buffer registers 38 also generate coordination characters which are referred to hereinafter as fill characters. A fill character is generated and transmitted whenever data is not ready for transmission at the data channel input. The data characters are applied to a gate 40 with their corresponding commutation pulses and are transferred out of the channel buffer registers 38 under the control of output control logic 42, through the gate 40 and into the interlace logic 14 in proper time relationship with the sync character from the commutation and timing pulse generator and the other data characters from the other input channels.

After the channels are separated by the channel sorting logic 28, they are applied to their corresponding output data channels. These output channels contain, as shown in the case of the first output channel 30, channel buffer registers 44 which detect the fill characters and also provide for the generation of a special character when the system loses synchronization. This special character is outputted to the data channel output and may be printed on a teletypewriter or other readout device associated with the data channel to indicate to the operator that the channel has gone out of sync. Data rate control logic 46 is responsive to the detection of fill characters and controls the readout rate by controlling a readout clock derived from the clock oscillator 22. Output control logic 48 controls the channel readout in a manner to preserve the same message output rate, on average, and format, as was inputted to the corresponding input data channel. The output control logic 48 also translates the character format from a 6-bit code to a 7½-bit code to preserve integrity in regard to character format.

Figures 2, 8:
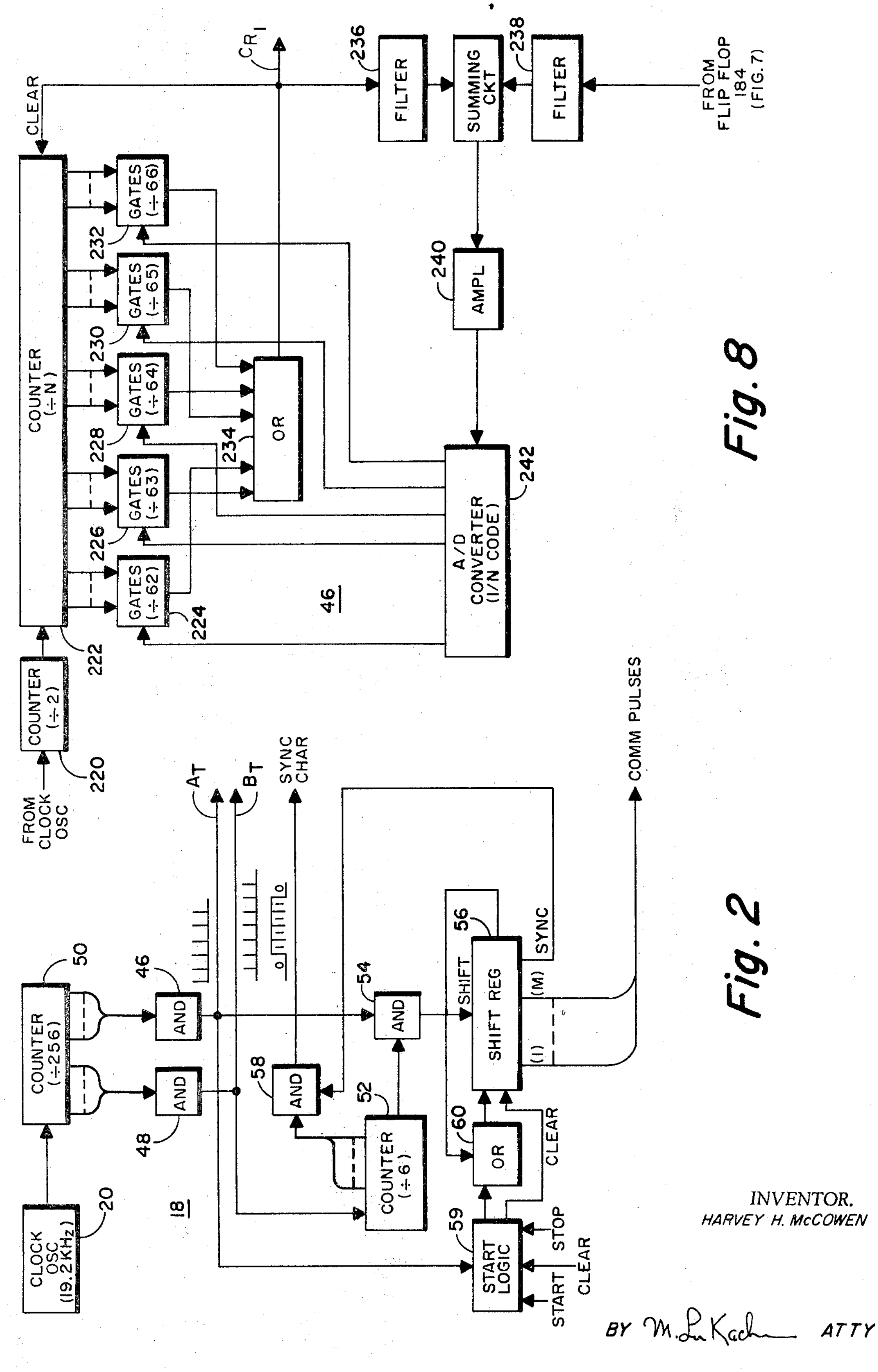
FIG. 2 is a block diagram of the commutation and timing pulse generating circuits of the system shown in FIG. 1.
FIG. 8 is a block diagram of the rate control system which is used in the time division multiplex system of FIG. 1 to control and adjust the output frequency of each channel.

The commutation and timing pulse generator 18 is shown in greater detail in FIG. 2. The master timing is derived from the clock oscillator 20 which in the case of the 75 bps system described herein for purposes of illustration, has a frequency of 19.2 kHz. The time division multiplex link bit rate may be altered by changing the frequency of this oscillator.

System clock pulses at a rate of 75 bps are indicated as $A_T$ and $B_T$ at output lines from AND gates 47 and 49 respectively. These gates are enabled when counts of 256 and 128 are registered in a recirculating counter 50. The clock $B_T$ is a late clock and the gating pulses to the gate 49 which generates this clock are selected to correspond to the count of 256 so that they are 180° out of phase with (viz, one-half of a bit period later than) the early clock $A_T$. Two clocks are used to avoid switching transients. The late clock $B_T$ is divided by 6 in a counter 52 and applied to an AND gate 54 where it gates the early clock $A_T$ to provide a shift pulse to a shift register 56 which generates the commutation and sync pulses. The sync character is generated by connecting different stages of the divide by 6 counter 52 to the input of an AND gate 58 which gates them out to the sync character line upon occurrence of a pulse from an output of a shift register 56. The sync character is chosen to be made up of six bits 011110. These bits and their time relation to the clock pulses $A_T$ and $B_T$ are shown by the waveforms adjacent to the clock lines $A_T$, $B_T$ and the sync character line. The shift register generates the commutation and sync pulses by recirculating the output pulse of the register through an OR gate 60 back into the input of the register. Initially, the register is cleared by means of start logic 59 which may comprise manually operated switches on the front panel. Thus, when a stop or clear push button is depressed, a clear pulse is applied which clears the shift register 56. When the start switch is actuated, the next early pulse $A_T$ is permitted to pass through the OR gate 60 and is loaded into the input of the shift register 56, whereupon it circulates, generating the commutation and sync pulses.

Figure 3:
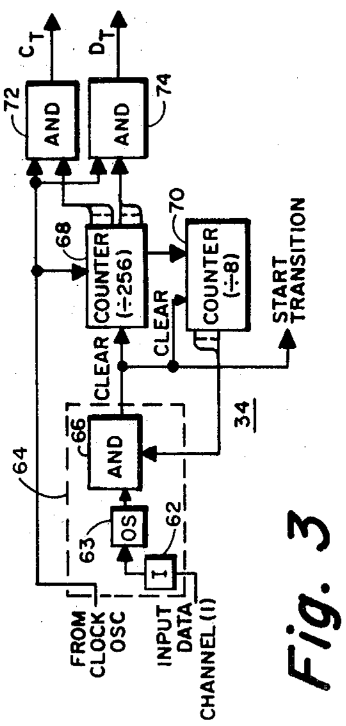
FIG. 3 is a block diagram of the input control logic for the input channels of the time division multiplex system shown in FIG. 1.
Figure 9:
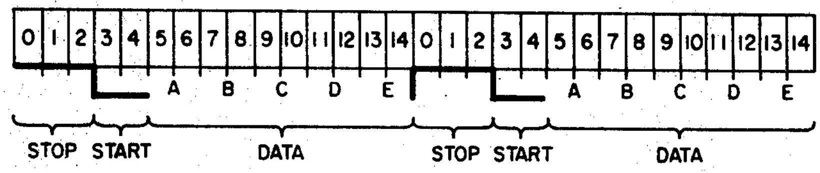
FIG. 9 is a chart including a truth table which illustrates the operation of the output control logic in each of the output channels of the multiplexing system shown in FIG. 1.

The input control logic is shown in FIG. 3. The system is synchronized to a start transition of each character. The characters are shown by way of example in FIG. 9. It will be noted that the start transition is a negative-going portion of the input bit train from the input channel. This bit train is inverted in an inverter 62 which is part of the start transmission sensing logic 64. Thus, when a start transition occurs, a one-shot 63 in the logic 64 generates a pulse of short duration. This pulse is applied to an AND gate 66. A counter 68 which divides by 256 counts the pulses from the clock oscillator.

Assume that a second start transition is detected or sensed by the logic 64. The counter is then reset or cleared by the AND gate 66 output every 75 data bits. In order to preclude a data bit other than a start transition from synchronizing the counter 68, another counter 70 which divides by 8 is provided. When this counter reaches a count of 7, it applies an input to the AND gate 66 in the sensing logic 64. The AND gate 66 is then enabled only after the passage of 7½ bits which make up a character of the input data. By virtue of the inhibiting action of the counter 70, the counter 68 will be synchronized to the input data on a character-by-character basis quickly at the beginning of the data transmission.

A pair of AND gates 72 and 74 provide early and late clocks which are synchronized to the data. These clocks being identified as $C_T$ and $D_T$ respectively. The AND gates 72 and 74 are enabled when the counter 68 reaches a count of 128 and 256 respectively. The AND gate 74 is therefore enabled one-half of a bit time later than the AND gate 72. Thus, the early clock $C_T$ occurs at the anticipated bit transition time, while the later clock $D_T$ occurs midway between the anticipated bit transition times.

The input control logic also produces a start transition pulse which is the same pulse as the clear pulse which is produced by the start transition sensing logic. This pulse is useable once the input control logic is synchronized to the input data.

Figure 4:
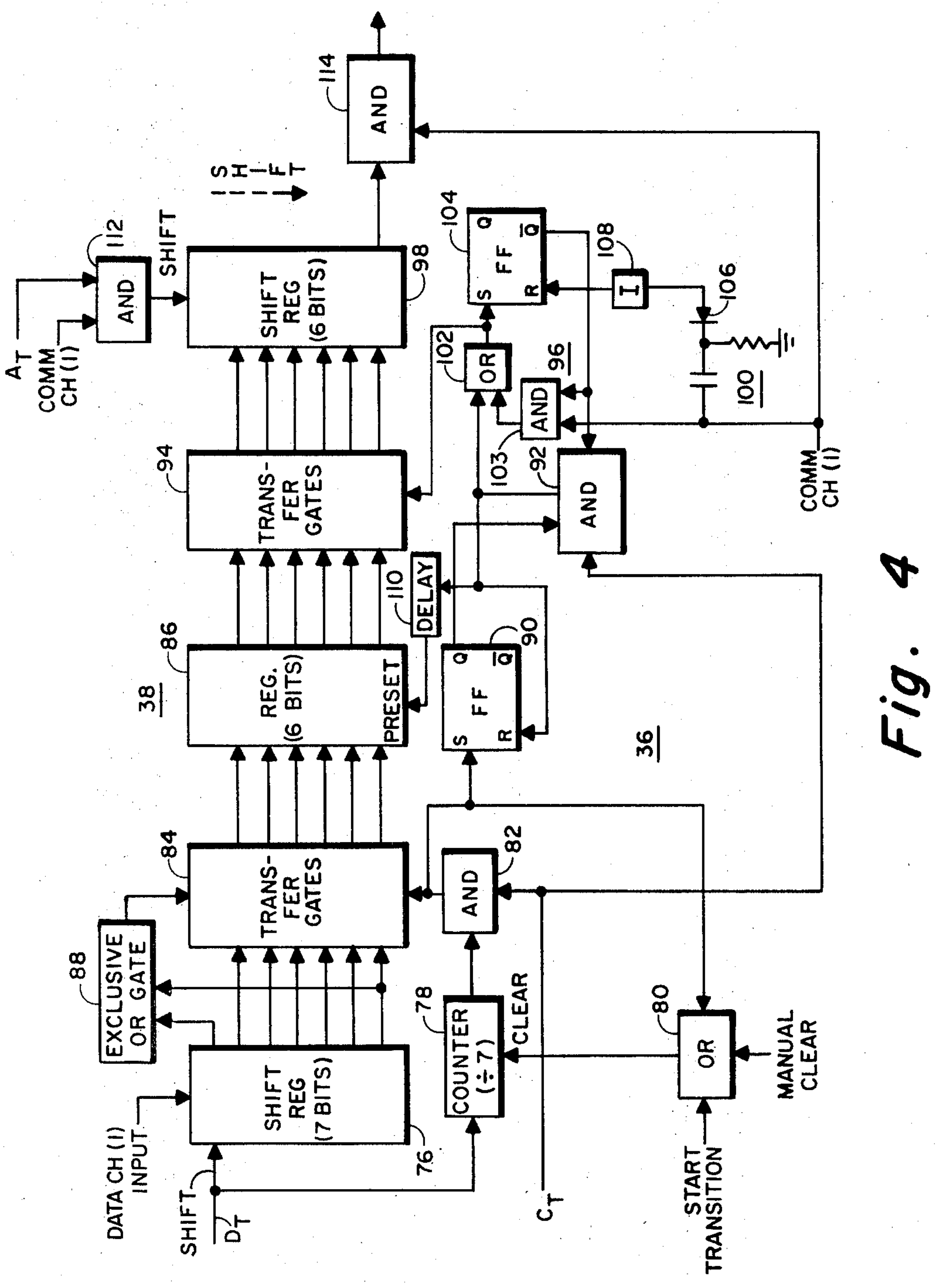
FIG. 4 is a block diagram of the channel buffer registers in the input channels of the system shown in FIG. 1 which further illustrates the means whereby coordination characters are generated and transmitted in order to maintain proper rates for data transmission.

The channel buffer registers 38 and their associated data rate control logic 36 are shown in greater detail in FIG. 4. The first data channel input is applied to the input of a shift register 76 in the channel buffer registers 38 and is shifted into this register 76 by the clock pulses $D_T$. A counter 78 which divides by 7 also receives the clock pulses $D_T$. This counter is cleared by a start transition pulse from the input control logic 34 via an OR gate 80. A manual clear is also provided which may be actuated by a front panel switch. Thus, when a count of 7 is stored in the counter 78, an output appears which indicates that the shift register 76 is loaded with a character. The counter 78 then clears after the next $C_T$ pulse which passes through the AND gate 82 which is enabled by the counter 78 output. The next $C_T$ pulse also enables the transfer gates 84 which transfer the data from the shift register 76, in parallel, to a 6-bit register 86.

An exclusive OR gate 88 which is connected to the stages of the register 76 which store the first and seventh bit are also connected through the transfer gates 84 to the first stage of the 6-bit storage register 86. Thus, five bits which are stored in the shift register are transferred directly through the transfer gates 84 into the 6-bit register 86, while the first and last bits are exclusively ORed so as to provide a new stored first bit in the 6-bit register 86. As mentioned formerly, a 6 unit code is sufficient for transmission of data and is more efficient than a 7½ unit code, inasmuch as more information can be transmitted at lower bit rates across the link with the 6-bit code. By virtue of the nature of the code, the initially received first (start) and seventh (stop) bit is reconstructed upon demultiplexing in the output control logic 48 at the receiving end of the system, as will be described more fully hereinafter. More specifically, if the exclusive OR gate output is a 1 bit, it signifies that the character transferred to the 6-bit register 86 is input data. However, if the output of the exclusive OR gate 88 is a zero bit, the transferred character is a coded control character containing either all spaces (zero bits) or all marks (1 bits). The relationship between the exclusively ORed bit from the output of the exclusive OR gate 88 and the other bits of the input character are set forth in Table 1 below.

TABLE 1

| (1st) START bit | 7th STOP bit | Exclusive ORed bit (F) | Data E | D | C | B | A | Character transmission |
|---|---|---|---|---|---|---|---|---|
| 0 | 0 | 0 | 0 | 0 | 0 | 0 | 0 | All space. |
| 1 | 1 | 0 | 1 | 1 | 1 | 1 | 1 | All marks. |
| NA | NA | 0 | (*) | (*) | (*) | (*) | (*) | Coded control (preset into register 86). |
| 0 | 1 | 1 | X | X | X | X | X | Data. |

NA = not applicable
* = as coded by TDM system
X = input data

A flip-flop 90 is set by the transfer pulse from the output of the AND gate 82. Thus, indicating by virtue of its set state, that the 6-bit register 86 is loaded with data. Upon being set (the Q output of the flip-flop 90 is high), an AND gate 92 is enabled and passes the next occurring early clock pulse $C_T$, via an OR gate 102, to enable another set of transfer gates 94. In order to maintain the data and control character transfer through the system at the desired maximum rate (in this example 75 bps), an auxiliary transfer pulse is developed from the lading edge of the commutation pulse.

The AND gate 92, however, is also connected to a system of circuits 96 which preclude the enabling of the transfer gates 94 during the period of commutation for the channel. In other words, the transfer pulse is not passed by the AND gate 92 when information is being read out of a final 6-bit register 98 into the interlace logic 14 (FIG. 1). Specifically, the leading edge of the commutation pulse is applied to a differentiating circuit 100 and simultaneously applied to an input of an OR gate 102 via an AND gate 103. The trailing edge of the commutation pulse then causes a flip-flop 104 to be reset. When the flip-flop is reset, the $\overline{Q}$ output thereof is high and therefore enables the AND gate 103. The leading edge of the next commutation pulse will then set the flip-flop via the gates 103 and 102. When the flip-flop 104 is set (i.e. during the commutation pulse period) the AND gate 92 is inhibited from passing a transfer pulse, thus inhibiting loading of the shift register 98. At the end of the commutation pulse, the negative-going pulse is produced by the differentiating circuit 100 which is passed through a diode 106 and applied after being inverted in an inverter 108 to reset the flip-flop 104. Thus, at the end of the commutation pulse, the flip-flop 104 is reset.

The pulse from the AND gate 92 is also applied to reset the flip-flop 90 and set the flip-flop 104. When the flip-flop 104 is set, it indicates that the final 6-bit shift register 98 is loaded. When the flip-flop 90 is reset, it indicates that the first 6-bit register 86 is empty.

The pulse from the AND gate 92 is also passed to a delay circuit 110, such as a one-shot multivibrator, to preset the first 6-bit register to the coordination or fill character code. If valid data arrives before the next transfer pulse from the OR gate 102, such valid input data is written over the fill character. If the contents of the first 6-bit register 86 are not written over by input data, the fill character is transferred to the final register 98 upon occurrence of the transfer pulse from the OR gate 102 which is generated by the leading edge of the commutation pulse and passed to the transfer gates 94 via the AND gate 103 and OR gate 102.

The input data and fill characters are read out at the TDM link rate (viz, 75 bits per second) by shift pulses which are obtained from an AND gate 112. These shift pulses are derived from the early clock $A_T$ when the AND gate 112 is enabled by the commutation pulse for the channel. The output from the final register 98 is read into the interlace logic 14 (FIG. 1) through an AND gate 114 which is enabled also by the commutation pulse for the first channel. Thus, switching transients which occur in the course of entry and readout of data from the shift register during other periods of time than the requisite commutation period are inhibited from arriving at the interlace logic 14.

Figure 5:
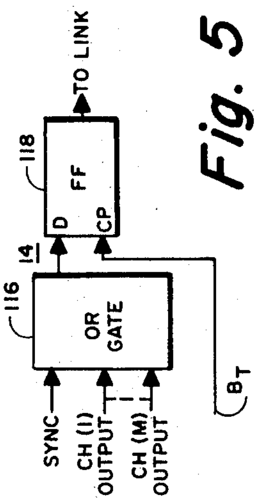
FIG. 5 is a block diagram of the interlace logic in the transmission section of the multiplex system shown in FIG. 1.

The interlace logic 14 is shown in greater detail in FIG. 5. It includes a multiinput OR gate 116 to which the sync characters from the commutation and timing pulse generator 18 and the final shift register 98 outputs of the various input channels (1) through (M) are applied. Since these characters are applied sequentially under the control of their various commutation pulses, a series of bits will be read out of the OR gate to the D or data input of a D type flip-flop 118. The late clock pulse $B_T$ is applied to the clock pulse input of the flip-flop and causes readout of the data stored therein to the modem of the link.

Figure 6:
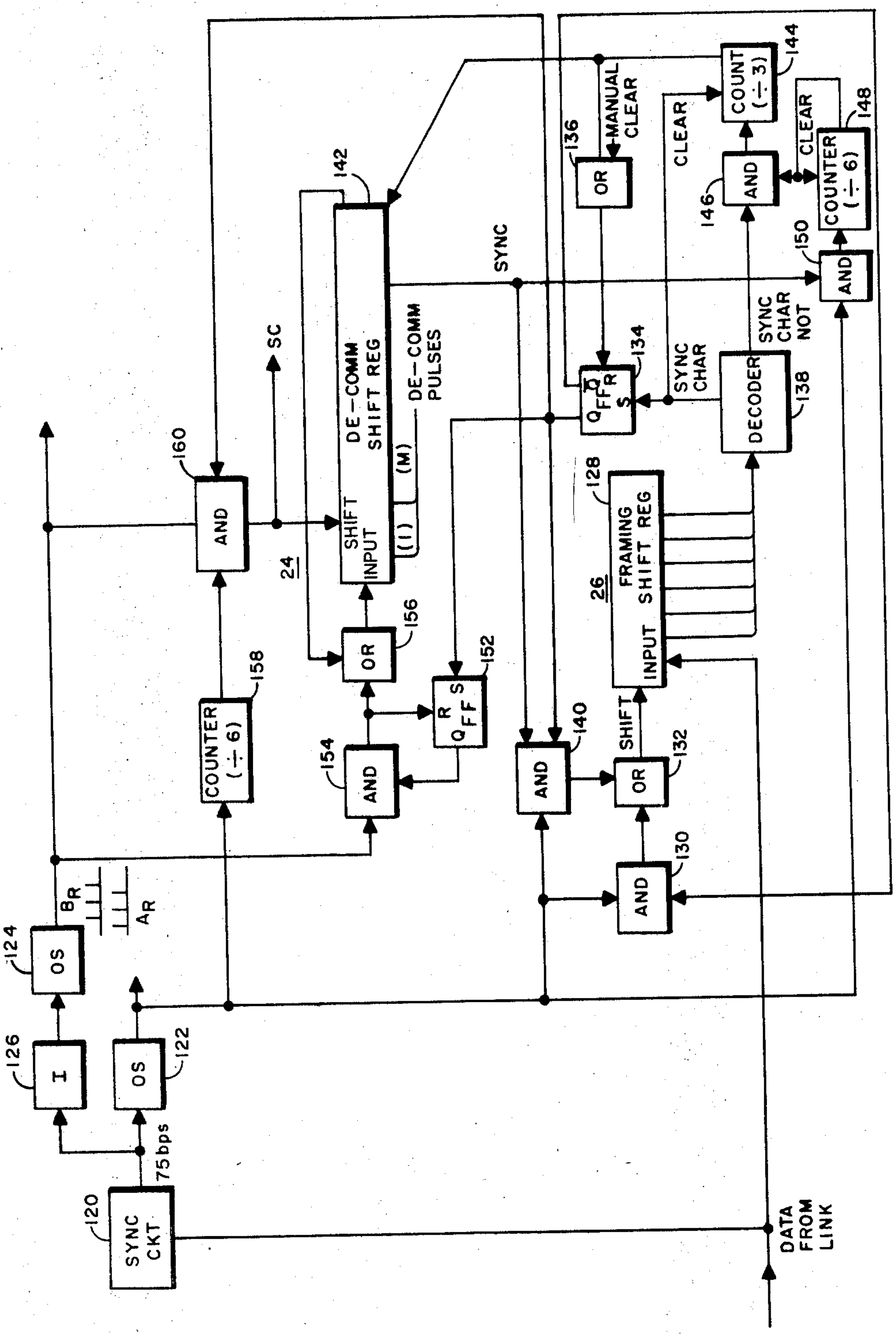
FIG. 6 is a block diagram of the frame synchronization logic and decommutation pulse generation system which is used in the receive or demultiplexing portion of the system shown in FIG. 1.

The demultiplexer portion of the system is operative to acquire frame synchronization to sort the interleaved data into its corresponding output channel and to read out from the output channel the requisite input data at an average rate corresponding to each input data channel input rate. The decommutation pulse generator and frame synchronization logic for accomplishing some of the foregoing functions is shown in FIG. 6. The data from the link is derived from its receive modem which includes a synchronizing circuit 120, such as a phase lock loop which is synchronized to the incoming bit rate (viz, 75 bits per second) and provides an output pulse train at that rate. This pulse train is applied to two one-shot multivibrators 122 and 124, the latter via an inverter 126. The one-shot multivibrator is triggered by the leading edge of each 75 bit per second pulse and provides a train of early clock pulses indicated as $A_R$. The inverter 126 provides a 180° phase shift, such that the second one-shot 124 provides a second train of clock pulses indicated as $B_R$ which are 180° out of phase with the early clock pulses $A_R$. These clock pulses are used to control the transfer of data into the output channels and to control the outputting of data from these channels.

The frame sync logic 26 is made up of a framing shift register 128. Data from the link is applied to an input of this shift register. Shift pulses for shifting the data through the register are $A_R$ clock pulses which are applied to the shift input of the register 128 via an AND gate 130 and an OR gate 132. The AND gate 140 is normally inhibited when the system is out of sync by virtue of a flip-flop 134 being in its reset state. This flip-flop is reset by way of an OR gate 136, when a manual clear pulse is passed through the OR gate 136. The manual clear pulse is obtained by means of a switch actuated by a pushbutton on the front panel of the system. Thus, when the system is out of sync, or during initial operation, each data bit is shifted through the framing shift register and is applied to the input of a decoder 138 which provides two outputs; one at its "sync char" output in the case a sync character is recognized and decoded and the other at its "sync char not" output in all other cases.

When the sync character is detected by the decoder 138, the flip-flop 134 is set, thereby inhibiting the AND gate 130 and enabling another AND gate 140. The AND gate 140, however, is enabled only during the sync character time slot by virtue of receiving an input from the decommutation shift register 142 in the decommutation pulse generator 24. Thus, clock pulses $A_R$ will only be applied to shift data through the framing shift register 128 during the sync character interval.

Once the system has acquired frame synchronization, three synchronizing characters in a row must fail to be decoded before returning to a search mode, thereby preventing noise bursts or isolated errors from upsetting the timing. To this end, a counter 144 is provided. The "sync char not" outputs from the decoder which indicate failures to sense a sync character are applied to this counter 144 through an AND gate 146. This AND gate 146 is enabled at the end of the sync character interval by virtue of another divide by six counter 148 which counts the early clock pulses $A_R$ only during the sync character interval; these clock pulses being applied to the counter via an AND gate 150 which is enabled only during the sync character interval. Thus, the count of the counter 144 is incremented only during the sixth bit of each sync character. After a count of six, the counter 148 clears itself. When a count of three is registered in the counter 144, the flip-flop 134 is reset, thereby again enabling the first AND gate 130; thus, instituting the search mode during which each data bit is entered and shifted through the framing shift register 128. Of course, when a sync character is detected, on each such detection the counter 144 is cleared. Thus, three sequential not sync characters must be detected before the search mode is once more reinstituted.

The decommutation pulses are generated by the decommutation shift register 142. This register is cleared automatically when the system is in the search mode by virtue of an output from the counter 144 being applied to the clear input of the register 142. When the system is locked, a flip-flop 152 is set by the sync character storage flip-flop 134, thus enabling an AND gate 154, which passes the clock pulses $B_R$ through an OR gate 156 to the input of the decommutation shift register 142. The flip-flop 152 is thereupon reset. The pulse inputted to the shift register 142 is recirculated via the OR gate 156 by means of the shift pulses which are applied to the register 142. The shift command every six bits (viz, the rate of 12.5 bps) is generated by a divide by six counter 158 which enables an AND gate 160. In the interest of assuring that no decommutation pulses will be produced during the search mode, the sync character memory flip-flop 134 also must be set before the AND gate 160 is enabled.

The late clock pulse $B_R$ is passed through the AND gate 160 every six bits to provide a shift command (SC) which is applied to the shift input of the register 142. The register then outputs the decommutation pulses for each of the output channels (1) through (M), as well as the sync pulse.

Figure 7:
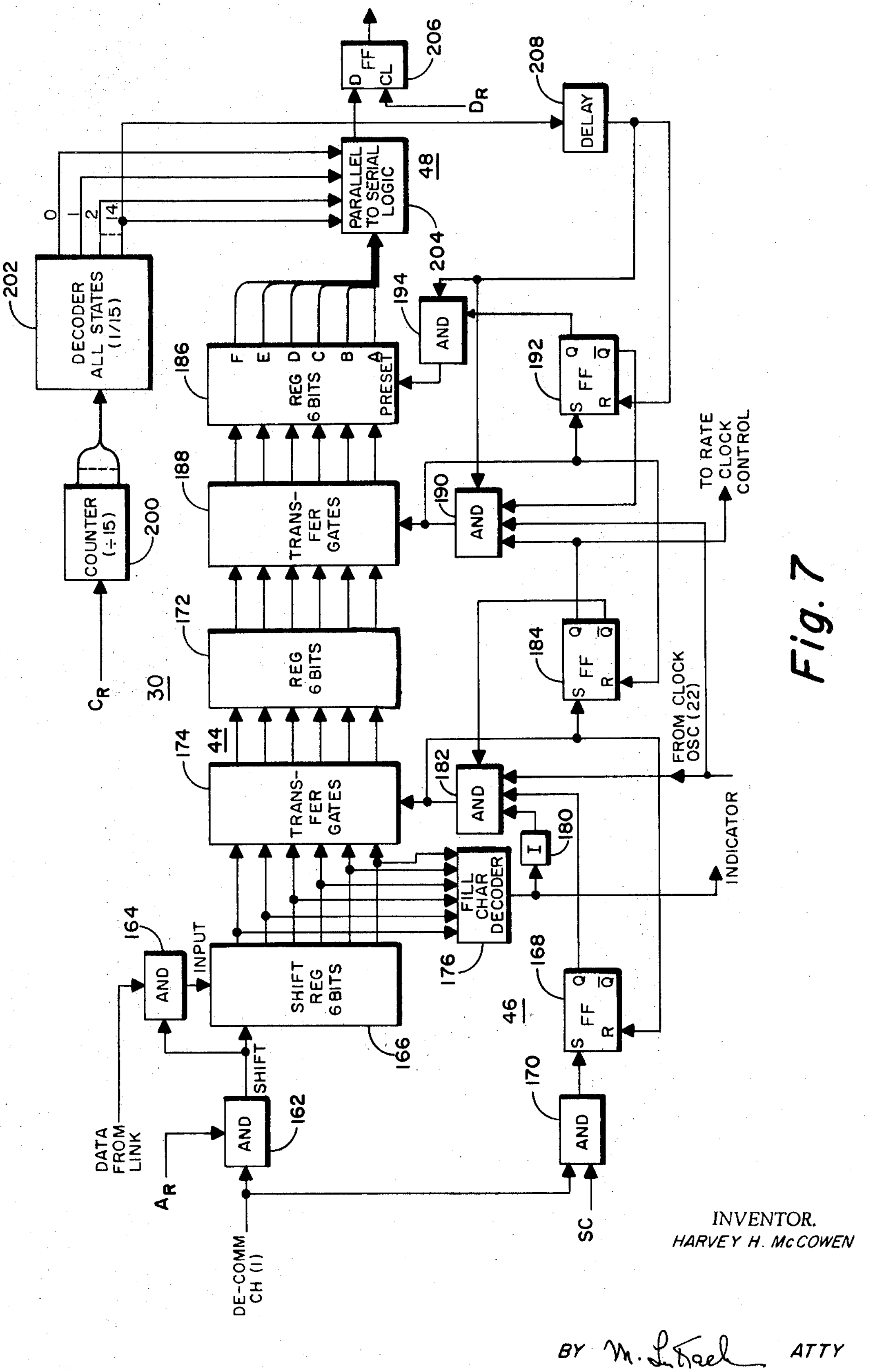
FIG. 7 is a block diagram of one of the output channels of the demultiplexing portion of the system shown in FIG. 1, further showing a means for deriving the coordination characters and assuring that the average data output rate corresponds to the data input rate from the sources which feed the multiplex system.

The decommutation pulses are applied to the channel sorting logic 28 (FIG. 1) which may be a series of AND gates, one for each of the channels. Referring particularly to FIG. 7, an AND gate 162 cooperates with another AND gate 164 to provide channel sorting logic for the first output channel 30. The clock pulses $A_R$ are gated through the gate 162 into the gate 164 during the decommutation pulse for the first channel. These pulses then enable the AND gate 164 to pass the data from the link during the first channel interval and only during the time when the bit is expected, thus safeguarding the system from noise and other sources of data errors which could be produced if data was permitted to be inputted to the output channels during time other than the correct data bit time.

The data is inputted to the first register 166 of the channel buffer registers 44 in the first output channel 30. This register receives the bits of each character serially and stores all six bits. A portion of the data rate control logic 46 includes a flip-flop 168 which is set by the shift command pulse (SC) which occurs simultaneously with the decommutation pulse for the first channel via an AND gate 170, thereby indicating that the first shift register 166 is loaded.

Inasmuch as the fill characters are not part of the original data, they must be inhibited from reaching the channel output. The frequency of the fill characters also is related to the original input data rate from the input data source which feeds the channel at its transmitting end. The fill characters are decoded by means of a fill character decoder 176 and used for two purposes; first to inhibit the generation of a transfer pulse, thereby precluding the transfer of fill characters to a second register 172 via transfer gates 174, and secondly to provide an output signal by way of a flip-flop 184 to control the channel clocking rate and therefore maintaining the average rate of output data from the channel to be the same as the average rate of the data which is supplied from the input data source at the transmitting end of the channel.

To this end, the transfer pulse for enabling the transfer gates 174 is generated only in those cases where a fill character is not detected. An inverter 180 is connected between the output of the fill character decoder and an input of an AND gate 182 which passes the transfer pulse to the gates 174. This AND gate 182 is enabled only after the first register 166 is full as indicated by the flip-flop 168 being in its set state. The second register 172 must also be available to receive the data. The latter condition is indicated when the flip-flop 184 is reset. The transfer pulse is generated when a timing pulse which may be obtained from the high frequency clock oscillator 22 (FIG. 1) is produced. Upon transfer of the data from the first register 166 to the second register 172, the flip-flop 184 is set indicating that the second register is loaded and the flip-flop 168 is reset indicating that the first register 166 is now empty. The output of the fill character may be applied to an indicator such as a counter having a numeric display device which can indicate the number of fill characters which are detected, thereby giving an indication of the utilization of the channel. The rate at which the fill characters are decoded may be utilized directly to control the subchannel clocking rate. However, it has been found desirable to utilize the output of the flip-flop 184 to provide a control signal as a function of the length of time that the flip-flop is set. The duration of this control signal is related to the frequency of the transfer pulses produced by the AND gate 182. This frequency will be low when the fill character rate is high (viz, inversely related to the fill character rate).

The characters are transferred from the second register 172 to an output register 186 by way of second transfer gates 188. These gates 188 are enabled by a transfer pulse which is produced by the clock oscillator 22 and passed to the gates 188 when an AND gate 190 is enabled. This AND gate 190 is enabled when the second register 172 is loaded and the third or output register 186 is empty. The latter condition is indicated by a flip-flop 192 which is set by the transfer pulse from the gate 190 and reset by a pulse which is generated by the output control logic 48. In the interest of precluding possible generation of these transfer pulses at undesired times, the output control logic pulse which resets the flip-flop 192 is also applied to the AND gate 190 so that it is enabled only when the output pulse occurs. This precludes the transfer of data during the time that bits are being read out of the output register 186.

The output pulse from the output control logic 48 is applied to a preset input of the third register 186 immediately after the data in the third register 186 is read out. This condition is signalled by the control logic output pulse from delay circuit 208. Then an AND gate 194 is enabled by the flip-flop 192. Thus, after a character stored in the third register 186 is read out, the register 186 is preset to some code character, such as represents an asterisk. Accordingly, asterisks would be transferred to the output register and read out of the channel in the event that only fill characters were being transmitted. Of course, if data is transmitted, the data stored in the first shift register 166 will be written over the code character which is preset to the register and the requisite data character would be read out. An operator could then readily determine malfunctions in the subchannel or the improper utilization thereof if the channel output as obtained from a teletypewriter or printer was merely a string of asterisks. Asterisks are read out when the demultiplexer loses synchronization and is also an indication of improper operation.

It will be recalled that the data which is transmitted is in the form of a 6-bit code where the first bit of the code indicated as bit F in the block representing the register 186 is the result of exclusive O-ring OR gate 88 (FIG. 4). The output control logic 48 translates the 6-bit character into a 7-bit character. To this end, a first channel clock $C_{R_1}$ nominally at twice the bit rate or 150 pulses per second, which is generated by the data rate control logic 46, shown in greater detail in FIG. 8, is applied to a counter 200 which divides $C_{R_1}$ clock by 15. This counter 200 provides 15 unique combinations or states at a rate of 10 per second. All the stages of the counter are applied to a decoder 202 which produces a 1 out of 15 code on 15 output lines. The period of each code state will be 1/150th of a second. Thus, 15 different decoding intervals exist during each 7.5-bit character or code interval. These intervals are illustrated diagrammatically in the upper part of FIG. 9. The outputs from the decoder, as well as the its representing the character (bits A to F), which are stored in the register, are presented to a parallel-to-serial conversion logic network 204. Inasmuch as a different one of the decoder outputs will be a 1 bit unlike the other outputs thereof are 0, during each of the 15 counter states only that decoder output is indicated in the column headed "counter state". This logic network contains a plurality of gates which are connected in accordance with conventional logic design techniques to satisfy the truth table set forth in FIG. 9. Two intervals are used to produce the first or start bit. Three intervals are used to produce the last or stop bit. Two intervals are used to produce each of the five data bits A through E. The 6-bit code is thereby converted into a 7.5-unit code during parallel-to-serial processing in the network 204. The sixth bit (bit F) is translated into a standard 1.5 unit stop (logical 1 bit) and a 1 unit start (logical 0 bit), inasmuch as the logic of the parallel-to-serial conversion network satisfies the truth table 1 which is set forth above. In other words, if bit F is a logical 0, both the start and stop intervals will be the same state. This state is determined by the values of the other five bits in the output register 186. If all of these data bits are 1, both the stop and start bits will be 1 bits. If the data bits are all 0, both the stop and start bits will be logical 0 bits corresponding to all space transmission, inasmuch as no other combinations are allowed by the coder (see table 1). The logic network 204 is therefore sufficient to decode any possible code combination into the requisite 7.5 unit code.

A D type flip-flop 206 which is clocked by a channel clock pulse $B_B$ which may be generated by means of the inverter 126 and one-shot, 124 (FIG. 6), is used to read the data out of the channel into a utilization device, such as a teletypewriter or printer. The decoder output which produces a pulse corresponding to the last time interval is delayed in a delay circuit 208 and used as the output control logic output pulse which is mentioned above in connection with the preset and transfer functions of the third register 186.

The frequency control portion of the data rate control logic 46 is shown in FIG. 8. The clock oscillator 22 (FIG. 1) which may be a local clock which is part of the received modem or separately provided produces, in this illustrative example, pulses at a rate of 19.2 kHz. These pulses are applied to a counter 220 where they are divided to produce pulses at a rate of 9.6 kHz. These pulses are then counted in a counter 222 which is capable of dividing by a predetermined number indicated as N which is selected by the gates 224 to 232, one of which will clear the counter via an OR gate 234. In the illustrated case, the dividing ratio (N) of the counter 222 is greater than 66 (128 being suitable). These gates produce, when enabled, output pulses when the count in the counter reaches 62, 63, 64, 65 or 66. Of course, when the count is 64, the output rate will be exactly nominal (viz. 150 Hz).

The output of the gates are connected together to the OR gate 234 such that an output is produced from one of these gates depending on which is enabled and then recirculated to clear the counter 222. The output pulse from the OR gate is used to generate the output rate control pulses $C_{R_1}$. The rate of these pulses $C_{R_1}$ will vary incrementally depending upon which one of the gates 224 to 232 is enabled, inasmuch as the lowest order gate which is enabled will produce an output and clear the counter 222. In order to determine incremental corrections in the rate of $C_{R_1}$, the rate control signal level from the flip-flop 184 (FIG. 7) is compared with the DC level of the pulse train constituting $C_{R_1}$. Filter circuits 236 and 238 are used to filter $C_{R_1}$ pulse and flip-flop 184 output respectively.

These filtered outputs are applied to a DC summing circuit which may be a difference amplifier so that the difference between the flip-flop output level and the clock pulse output level produces an error signal. The error signal is amplified, preferably in the high gain low drift amplifier 240 which provides stability in the light of the relatively low rates of changes of the error signal and also insures that the control loop will have a relatively slow response time commensurate with the relatively slow changes in the fill character rate which would normally be expected. The error signal is applied to analog-to-digital converter 242 which includes a source of reference voltage which is compared with the analog error signal to produce a 1 out of N code, in this a 1 out of 5 code, which corresponds to one of the five gates 224 to 232. Normally, when the fill character rate is normal, the $C_{R_1}$ will be at the nominal rate of 150 Hz. Thus the divide by 64 gate 228 will be enabled by the analog-to-digital converter 242 output. If the fill characters increase or decrease in frequency, the other gates will be enabled which will change $C_{R_1}$ to have frequencies which are above or below the nominal frequency. Thus, the average data rate will be maintained at the output.

The output control logic was explained in connection with FIG. 7 and reconstitutes the character format. Accordingly, each of the output channels corresponds to the input data channels insofar as the characters and the format thereof are concerned. In the event that the channel duty cycle is low, it may be desirable to inhibit the readout of the final register 186 to occur on time spaced groups of the $C_R$ clock pulses.

From the foregoing description it will be apparent there has been provided an improved time division multiplex system capable of handling asynchronous data in an efficient manner utilizing the capacity of the system. The time division multiplex system provided by the invention also has safeguards against faulty operation. It will be appreciated that while a specific illustration of a time division multiplex system embodying the invention has been provided for purposes of explaining the invention that variations and modifications thereof within the scope of the invention will suggest themselves to those skilled in the art. For example, the data may be transmitted on a bit-by-bit basis and coordination bits inserted in the bit stream. The characters may be longer or shorter in bit length than those described in connection with this illustrative example of the system of the invention. Accordingly, the foregoing description should be taken merely as illustrative and not in any limiting sense.

I claim:

1. A time division multiplex system for transmitting information from a transmitting point to a receiving point over a link at a predetermined rate comprising:

a. a plurality of sources of input data, b. a plurality of transmission channels each associated with a different one of said sources and extending over said link, said transmission channels each having input and output channel portions respectively at said transmitting point and at said receiving point, said input channels each including a plurality of successive buffer registers and said output channels each including another plurality of successive buffer registers, and means for transferring said data between said successive registers, c. means in each of said input channels for controlling the rate of data transmission through the buffer registers thereof, so as to maintain said rate at said predetermined link rate, said rate controlling means including means for presetting coordination data in at least one of said input channel buffer registers, d. means connected to each of said input channels for transferring said coordination data together with said data from said sources from the last of said buffer registers thereof into said link and means connected to each of said output channels for the transferring of said coordination data and said information data from said sources from said link into the first of said successive buffer registers of said output channels, and e. means in each of said output channels responsive to said coordination data stored in at least one of said buffer registers thereof for controlling the rate of transmission of out data therefrom.

2. A time division multiplex system comprising:

a. a plurality of input channels and a plurality of corresponding output channels connected at opposite ends of a data link and providing a plurality of data transmission channels, each of said input channels including means for storing data, separate means in said output channels also for storing said data, b. means in each of said input channels for transferring input information data through each of said input channel storing means to said link at a predetermined rate, c. means in each of said input channels for storing fill data in said storing means of each input channel when said input data is applied to said input channels at slower than said given rate, d. means in said output channels for applying said information data and said fill data received across said link from their corresponding input channels to said output channel storing means, and e. a plurality of means each corresponding to a different one of said output channels and responsive to said fill data stored therein for controlling the rate at which data is read out of said output channel storing means of the one of said output channels corresponding thereto.

3. A time division multiplex system comprising:

a. a plurality of corresponding input and output channels adapted to be connected to opposite ends of a data transmission link over which data is communicated serially at a certain rate, each of said plurality of corresponding input and output channels and said link providing a separate one of a plurality of data transmission channels for separate sources of data, b. each of said input channels having a first plurality of successive data character storage registers, each of said output channels having a second plurality of successive data character registers, c. each of said input channels also including means for transferring said data into the first and out of the last of said first plurality of registers thereof at said certain rate and between said successive registers at a transfer rate equal to the quotient of the number of bits in said character and said certain rate, d. means for inserting a coordination character into one of said first plurality of input channel registers when input data is not applied thereto at said transfer rate, e. each of said output channels also including means for detecting said coordination characters in one of said registers of said second plurality of registers therein and inhibiting the transfer of said coordination characters between said one register and the next succeeding register of said second plurality of registers in its said output channel, and f. means also included in each of said output channels responsive to the rate at which said coordination characters are detected for controlling the rate at which data is outputted from the last of said output channel registers.

4. The invention as set forth in claim 3 including means in each of said input channels coupled to said input channel registers responsive to the data character stored in its immediately preceding input channel registers for reducing the number of bits in said data character and applying said reduced number of bit characters to said one input channel register, and means in each of said output channels connected to one of said output channels registers for translating said reduced bit characters into a format corresponding to the data characters stored in said immediately preceding input channel register.

5. The information as set forth in claim 4 including a source of timing signals associated with said plurality of output channels and wherein said coordination character responsive means includes means responsive to said timing signals for producing pulses having a variable repetition rate, means responsive to the rate at which said coordination characters are detected and said repetition rate of said pulses for deriving an error signal, and means responsive to said error signal for varying the repetition rate of said pulses, and means utilizing said pulses for reading said data characters out of the last of said output channel registers.

6. The invention as set forth in claim 5 wherein said reading out means includes output control logic including first logic means responsive to said pulses for producing timing pulses each in a separate one of a plurality of sequential timing intervals, said intervals each corresponding to a successive bit of said format, and second logic means connected to the last of said output channel registers and controlled by said timing pulses for reading out the bits of the data character stored therein sequentially in said sequential timing intervals whereby also to reconstitute said format.

7. The invention as set forth in claim 6 wherein said means for producing pulses having a variable rate comprises counting means, a plurality of gates coupled to said counting means each for resetting the counting means at different counts when enabled and for producing said timing pulses during different ones of said counts, an analog-to-digital converter for producing codes corresponding to different ones of said gates in accordance with the level of said error signal, and means connecting said converter to said gates for enabling a different one of said gates when said converter produces the code corresponding thereto for enabling different ones of said gates.

8. The invention as set forth in claim 6 wherein said first logic means of said output control logic includes a counter for counting said pulses, a decoder coupled to said counter for producing said timing pulses, each when said counter reaches a different successive counting state, and said second logic means includes a parallel to serial code converter having its parallel inputs coupled to said decoder and to said last register for reading said bits out of said register in different ones of said intervals selected.

9. The invention as set forth in claim 3 including a source of timing signals associated with said input channels, means for generating commutation pulses each corresponding to a different one of said input channels and sync characters in response to said timing signals; wherein said transferring means includes means for shifting input data serially into said first register, means for transferring data in parallel from said first register to said second register when said first register is full, means for transferring data from said second register to said third register at a said transfer rate and when said third register is empty, means under control of said timing signals and said commutation pulses for shifting data serially out of said third register; and wherein said inserting means includes means for presetting a fill character having a predetermined code in said second register immediately after the commutation pulse corresponding to said channel whereby the rate of data transfer out of said third register is maintained at said certain rate.

10. The invention as set forth in claim 9 including means responsive to said commutation pulses for inhibiting the transfer of data between said second and said third registers in each of said input channels during the period of its corresponding commutation pulse.

11. The invention as set forth in claim 9 including interlace logic responsive to the outputs of the third registers in each of said input channels and to said sync character for providing a serial stream of data to said link.

12. The invention as set forth in claim 11 including a source of timing signals associated with said output channels, means responsive to said output channel timing signals for producing a sequence of decommutation pulses each corresponding to a different one of said output channels, means for decoding said sync character, and means for inhibiting the generation of said decommutation pulses until said sync character is decoded.

13. The invention as set forth in claim 3 wherein said plurality of registers in each of said output channels comprise at least a first, a second and a third register; wherein said coordination character detection means includes means coupled to said first output channel register for decoding said coordination characters and providing an output when each said coordination character is decoded, means for transferring data from said first output channel register to said second output channel register when said first register is full and said second output channel register is empty, means responsive to said coordination character decoding means output for inhibiting the transfer of coordination characters to said second output channel register, means for transferring data from said second register to said third register when said third register is empty; and wherein said detected coordination character responsive means includes means for generating signals for reading out said third output register and enabling the transfer of data from said second to said third output channel register.

14. The invention as set forth in claim 13 including means operated by said third output channel register reading out signal generating means for presetting a special data character representing the presence of coordination characters and thereby the presence of transmission errors in one of said second and third output channel registers immediately after read out of data therefrom.